(12) United States Patent
Kim et al.

(10) Patent No.: US 10,741,078 B2
(45) Date of Patent: Aug. 11, 2020

(54) METHOD AND APPARATUS FOR PROVIDING TRAFFIC SAFETY SERVICE BASED ON DECISION LAYER MODEL

(71) Applicant: ELECTRONICS AND TELECOMMUNICATIONS RESEARCH INSTITUTE, Daejeon (KR)

(72) Inventors: Young Il Kim, Daejeon (KR); Dae Geun Park, Daejeon (KR); Hyo Chan Bang, Daejeon (KR); Soon Yong Song, Sejong-si (KR); Geon Min Yeo, Daejeon (KR); Sun Hwa Lim, Daejeon (KR); Byeong Cheol Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 303 days.

(21) Appl. No.: 15/820,669

(22) Filed: Nov. 22, 2017

(65) Prior Publication Data
US 2018/0144634 A1 May 24, 2018

(30) Foreign Application Priority Data

Nov. 23, 2016 (KR) .................. 10-2016-0156320
Nov. 20, 2017 (KR) .................. 10-2017-0155108

(51) Int. Cl.
*G08G 1/16* (2006.01)
*G08G 1/095* (2006.01)
(Continued)

(52) U.S. Cl.
CPC ............. *G08G 1/164* (2013.01); *G06Q 10/06* (2013.01); *G08G 1/012* (2013.01); *G08G 1/0129* (2013.01);
(Continued)

(58) Field of Classification Search
CPC ...... G08G 1/164; G08G 1/012; G08G 1/0129; G08G 1/0133; G08G 1/0141; G08G 1/052;
(Continued)

(56) References Cited

U.S. PATENT DOCUMENTS 7,376,509 B2 * 5/2008 Endo .................... G08G 1/0104
701/423
7,729,335 B2 * 6/2010 Lee ......................... H04L 47/11
370/349
(Continued)

FOREIGN PATENT DOCUMENTS

KR    10-2013-0092915 A    8/2013
KR    10-1438168 B1    9/2014
(Continued)

*Primary Examiner* — Nicholas Kiswanto
(74) *Attorney, Agent, or Firm* — LRK Patent Law Firm

(57) ABSTRACT

A method for providing a traffic safety service of a traffic safety service server communicating with a client terminal includes: receiving sensor data of each sensor from the client terminal; classifying the sensor data into data according to at least one specific time slot for each sensor and calculating a safety score of each of the at least time slot; calculating an average of the safety scores of the at least time slot and calculating a safety score for each sensor, and calculating a safety index on the basis of the safety score for each sensor and a weight assigned to each sensor.

18 Claims, 9 Drawing Sheets

FIRST EXAMPLE OF VIRTUAL SENSOR

(51) Int. Cl.

| | |
|---|---|
| *G06Q 10/06* | (2012.01) |
| *G08G 1/0967* | (2006.01) |
| *G08G 1/052* | (2006.01) |
| *G05G 1/01* | (2008.04) |
| *G01C 21/36* | (2006.01) |
| *H04B 1/3827* | (2015.01) |
| *G08G 1/01* | (2006.01) |

(52) U.S. Cl.
CPC ......... *G08G 1/0133* (2013.01); *G08G 1/0141* (2013.01); *G08G 1/052* (2013.01); *G08G 1/095* (2013.01); *G08G 1/09675* (2013.01); *G08G 1/096716* (2013.01); *G08G 1/096741* (2013.01); *G08G 1/096775* (2013.01); *G08G 1/096783* (2013.01); *G01C 21/36* (2013.01); *H04B 1/3827* (2013.01)

(58) Field of Classification Search
CPC ............ G08G 1/095; G08G 1/096716; G08G 1/096741; G08G 1/09675; G08G 1/096775; G08G 1/096783; G06Q 10/06; G01C 21/36; H04B 1/3827
See application file for complete search history.

(56) References Cited

U.S. PATENT DOCUMENTS

| | | | |
|---|---|---|---|
| 9,111,240 B2 | 8/2015 | Petite | |
| 9,183,176 B2 | 11/2015 | Lee et al. | |
| 9,456,302 B2* | 9/2016 | Skomra | G06Q 10/08 |
| 9,852,624 B2* | 12/2017 | Ginsberg | G08G 1/07 |
| 9,919,648 B1* | 3/2018 | Pedersen | G06K 9/00791 |
| 9,919,715 B2* | 3/2018 | Tseng | B60W 50/0097 |
| 9,928,741 B2* | 3/2018 | Harris | H04W 28/0247 |
| 2008/0120025 A1* | 5/2008 | Naitou | G01C 21/12 |
| | | | 701/33.7 |
| 2011/0037617 A1 | 2/2011 | Jang et al. | |
| 2015/0318015 A1* | 11/2015 | Bose | A63F 13/212 |
| | | | 386/248 |
| 2016/0357187 A1* | 12/2016 | Ansari | G01S 13/862 |
| 2018/0107935 A1* | 4/2018 | Jeon | G08G 1/202 |
| 2018/0284758 A1* | 10/2018 | Cella | G06N 3/084 |

FOREIGN PATENT DOCUMENTS

| | | |
|---|---|---|
| KR | 10-1513084 B1 | 4/2015 |
| KR | 10-1638368 B1 | 7/2016 |
| KR | 10-1652099 B1 | 8/2016 |
| KR | 10-1683262 B1 | 12/2016 |

\* cited by examiner

FIRST EXAMPLE OF VIRTUAL SENSOR

SECOND EXAMPLE OF VIRTUAL SENSOR

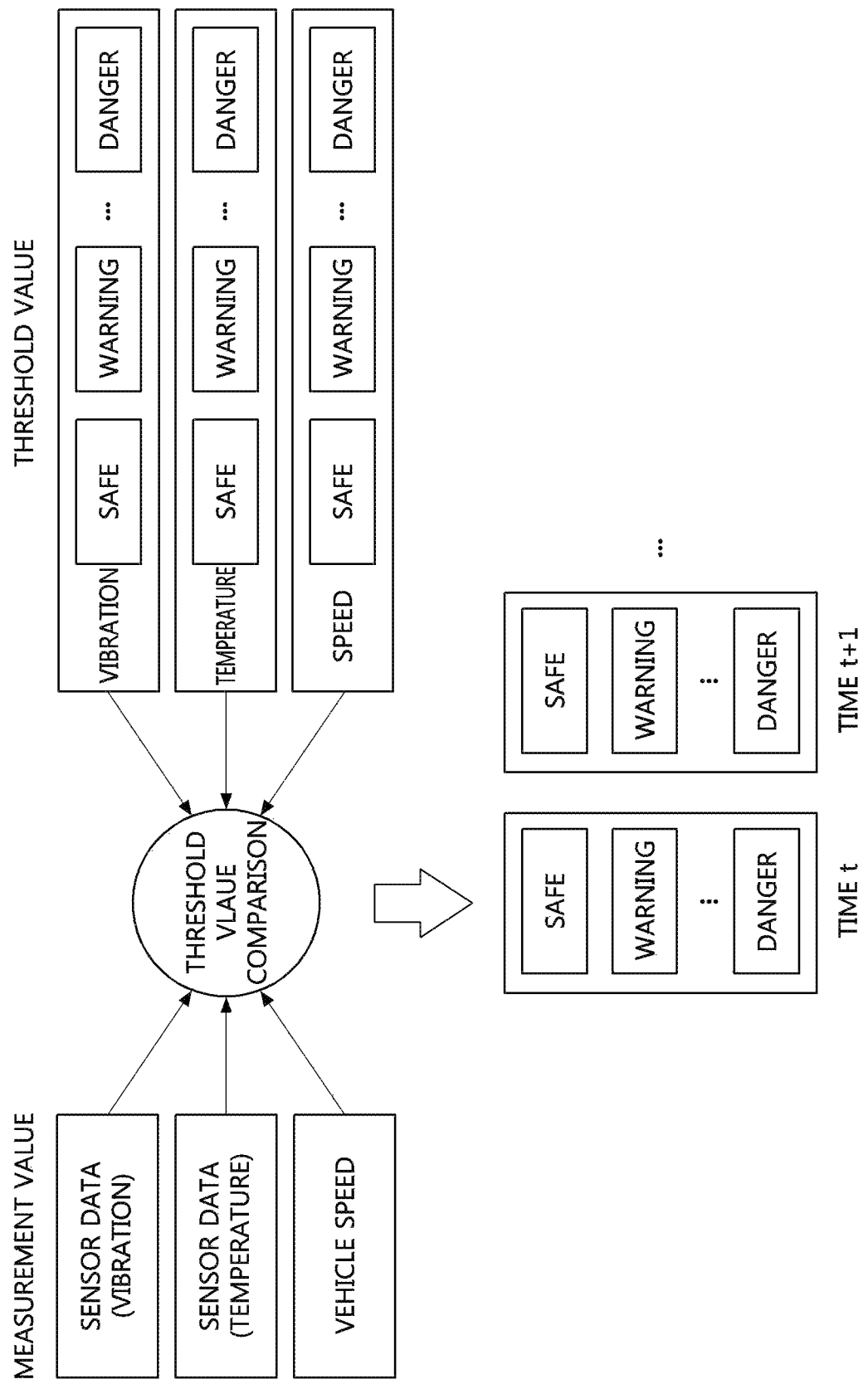

METHOD AND APPARATUS FOR PROVIDING TRAFFIC SAFETY SERVICE BASED ON DECISION LAYER MODEL

CROSS-REFERENCE TO RELATED APPLICATIONS

This application claims priority to Korean Patent Application No. 10-2016-0156320, filed Nov. 23, 2016, and Korean Patent Application No. 10-2017-0155108, filed Nov. 20, 2017, in the Korean Intellectual Property Office (KIPO), the entire contents of which are hereby incorporated by reference.

BACKGROUND

1. Technical Field

Example embodiments of the present invention relate in general to a method and an apparatus for providing traffic safety service based on a decision layer model and more specifically to a method and an apparatus for providing a traffic safety service configured to monitor transportation infrastructure and transports in real time through Internet of things (IoT) sensors, to prevent traffic incidents, and to quickly deal with traffic incidents.

2. Description of Related Art

In recent years, the frequency of traffic accidents has been increasing as transportation speeds increase, and the scale of damage is also increasing in traffic accident events. The main causes of such traffic accidents are vehicle malfunction, lack of transportation infrastructure safety, environmental factors such as fog and heavy rain, driver fatigue, elderly drivers, and the like. In the past, since there are many difficulties in monitoring the main causes of the above-described traffic accidents, it was difficult to prevent traffic accidents or to quickly deal with traffic accidents.

Internet of Things (IoT) has recently emerged due to the development of communication technology. IoT refers to technology or an environment in which sensors are equipped in objects exchange data in real time over the Internet, and research on application of IoT to vehicles and transportation infrastructure has begun. The present invention proposes a technology for preventing the above-described traffic incidents including traffic accidents or for quickly coping with traffic incidents by applying IoT to vehicles and transportation infrastructure.

SUMMARY

Accordingly, example embodiments of the present invention are provided to substantially obviate one or more problems due to limitations and disadvantages of the related art.

Example embodiments of the present invention provide a method and an apparatus for providing a traffic safety service based on a decision layer model and more specifically to a method and an apparatus for providing a traffic safety service configured to monitor transportation infrastructure and a transport in real time through Internet of things (IoT) sensors, to prevent traffic incidents, and to quickly deal with traffic incidents.

In some example embodiments, a method for providing a traffic safety service of a traffic safety service server communicating with a client terminal includes: receiving sensor data of each sensor from the client terminal; classifying the sensor data into data according to at least one specific time slot for each sensor and calculating a safety score of each of the at least time slot; calculating an average of the safety scores of the at least time slot and calculating a safety score for each sensor, and calculating a safety index on the basis of the safety score for each sensor and a weight assigned to each sensor.

The method further includes: generating sensor data for a virtual sensor on the basis of the sensor data of each sensor; and including the sensor data for the virtual sensor in the sensor data of each sensor.

The method further includes: correcting the safety index on the basis of safety knowledge including a correlation between the safety index and at least one environmental parameter of a previously stored weather, season, and vehicle type.

The method further includes: updating the safety knowledge on the basis of the sensor data of each sensor.

The method further includes: setting a threshold value on the basis of the sensor data of each sensor and the safety score of the at least one time slot.

The method further includes: determining whether a traffic incident has occurred on the basis of the sensor data of each sensor and the threshold value.

The method further includes: predicting at least one of a traffic incident type, a damage range of the traffic incident, and effects of the traffic incident by performing a traffic incident simulation on the basis of the sensor data of each sensor and the threshold value when it is determined that the traffic incident has occurred.

The method further includes: transmitting at least one of the threshold value and the safety index to the client terminal.

Wherein a weight for each sensor is stochastically determined on the basis of traffic incident statistics information.

In other example embodiments, a method for providing a traffic safety service of a client terminal communicating with a traffic safety service server and at least one sensor, the method for providing a traffic safety service includes: receiving a threshold value of sensor data from the traffic safety service server, receiving sensor data from the at least one sensor, detecting traffic incident occurrence or incident precursor information on the basis of the sensor data and the threshold value; and applying different processing to the sensor data in accordance with the detection result, processing the sensor data, and transmitting the sensor data to the traffic safety service server.

Wherein the applying of the different processing to the sensor data in accordance with the detection result, the processing of the sensor data, and the transmitting of the sensor data to the traffic safety service server includes: transmitting the sensor data as it is to the traffic safety service server when the traffic incident occurrence or incident precursor information is not detected.

Wherein the applying of the different processing to the sensor data in accordance with the detection result, the processing of the sensor data, and the transmitting of the sensor data to the traffic safety service server includes: calculating a movement value average of the sensor data and transmitting the movement value average to the traffic safety service server when the traffic incident occurrence or incident precursor information is detected.

In still other example embodiments, a traffic safety service server includes: a processor, and a memory storing at least one instruction, executed by the processor, for receiving sensor data of each sensor from a client terminal; classifying the sensor data into data according to at least one specific time slot for each sensor and to calculate a safety score of each of the at least one time slot; calculating an average of the safety scores of the at least one time slot and to calculate a safety score for each sensor; and calculating a safety index on the basis of a safety score of each sensor and a weight assigned to each sensor.

Wherein the instruction includes instructions for generating sensor data for a virtual sensor on the basis of the sensor data of each sensor, and including the sensor data for the virtual sensor in the sensor data of each sensor.

Wherein the instruction includes an instruction for correcting the safety index on the basis of safety knowledge including a correlation between the safety index and at least one environmental parameter of a previously stored weather, season, and vehicle type.

Wherein the instructions includes an instruction for updating the safety knowledge on the basis of the sensor data of each sensor.

Wherein the instruction includes an instruction for setting a threshold value on the basis of the sensor data of each sensor and the safety score of the at least one time slot.

Wherein the instruction includes an instruction for determining whether a traffic incident has occurred on the basis of the sensor data of each sensor and the threshold value.

Wherein the instruction includes an instruction for predicting at least one of a traffic incident type, a damage range of the traffic incident t, and effects of the traffic trouble by performing a traffic incident simulation on the basis of the sensor data of each sensor and the threshold value when it is determined that the traffic incident has occurred.

Wherein the instruction includes an instruction for transmitting at least one of the threshold value and the safety index to the client terminal.

According to the present invention, since real-time monitoring is provided through IoT sensors, traffic incidents can be prevented and traffic incidents can be quickly dealt with.

According to the present invention, a traffic incident can be quickly dealt with by distributing decision making and execution rights.

According to the present invention, since a simulation is performed by combining a plurality of IoT sensors, anticipated secondary damage can be prevented.

According to the present invention, it is possible to provide a more effective safety service by managing states of a transport and a transportation infrastructure according to time, season, and driver.

BRIEF DESCRIPTION OF DRAWINGS

Example embodiments of the present invention will become more apparent by describing in detail example embodiments of the present invention with reference to the accompanying drawings, in which:

FIG. 11 is a diagram for describing a method for sensing traffic incident occurrence or trouble precursors in the client terminal according to the embodiment of the present invention.

DESCRIPTION OF EXAMPLE EMBODIMENTS

Figure 1:
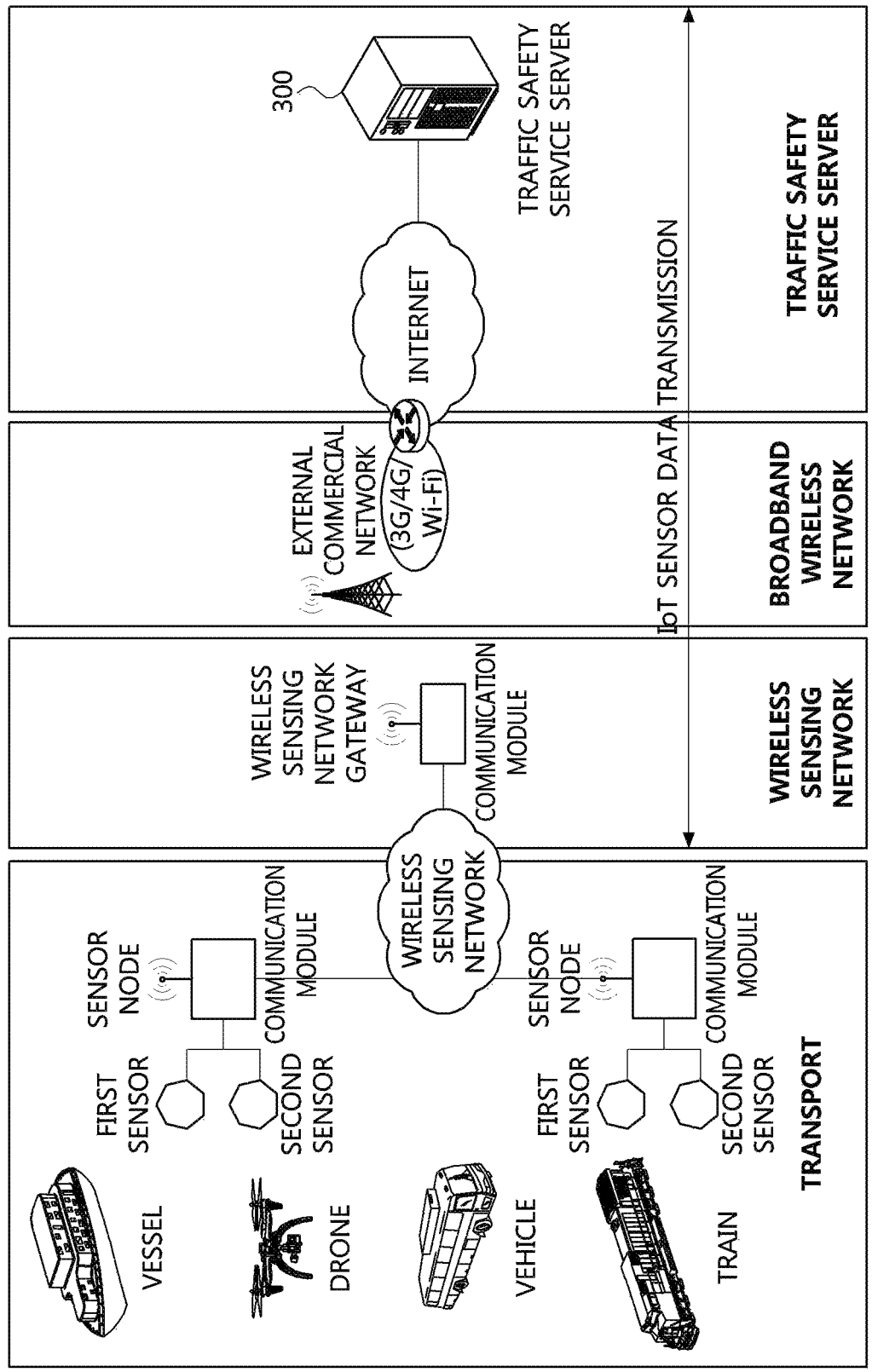
FIG. 1 is a conceptual diagram for describing a method for monitoring a traffic safety service providing device according to an embodiment of the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or connected to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

FIG. 1 is a conceptual diagram for describing a method for monitoring a traffic safety service providing device according to an embodiment of the present invention.

Referring to FIG. 1, a traffic safety service server 300 according to the embodiment of the present invention may monitor the traffic safety situation by receiving Internet of things (IoT) sensor data from a transport. To be more specific, transports including vessels, drones, vehicles, trains, and the like may form a wireless sensing network with a wireless sensing network gateway using sensor nodes to transmit IoT sensor data and the wireless sensing network gateway may transmit the IoT sensor data to the traffic safety service server 300 using an external commercial network such as 3G, 4G, and Wi-Fi networks, but the present invention is not limited thereto. Here, the sensor nodes may include a plurality of sensors such as a first sensor and a second sensor, and a communication module and the wireless sensing network gateway may include a communication module.

A traffic incident may include a situation in which the traffic is interrupted due to a flaw in transports, a flaw in transportation infrastructure, or the like, and a traffic accident and the like, and a traffic incident precursor may refer to a situation in which a traffic incident is predicted to occur.

Figure 2:
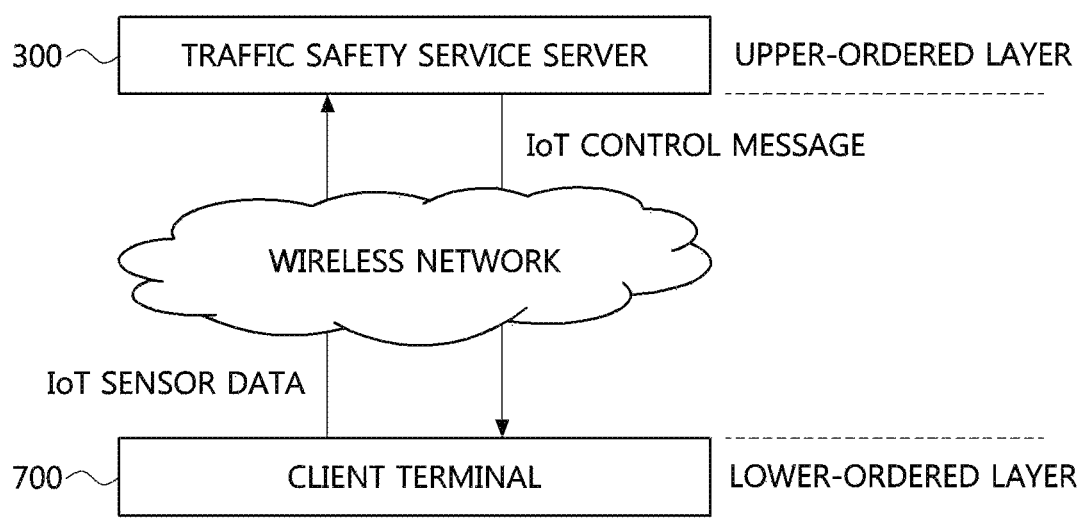
FIG. 2 is a conceptual diagram for describing a decision layer of the traffic safety service providing device according to the embodiment of the present invention.

FIG. 2 is a conceptual diagram for describing a decision layer of the traffic safety service providing device according to the embodiment of the present invention.

Referring to FIG. 2, the traffic safety service providing device according to the embodiment of the present invention may be realized through a wireless network between the traffic safety service server 300 and a client terminal 700. Here, the client terminal 700 may be an IoT terminal equipped in the transport.

To be specific, the traffic safety service apparatus according to the embodiment of the present invention may include sophisticated decision making in the traffic safety service server 300 and quick decision-making in the client terminal 700. Here, since one traffic safety service server 300 can communicate with a plurality of client terminals, receive and process data from the client terminal 700, and transmit the processed result to the client terminal 700, the traffic safety service server 300 may be referred to as an upper-ordered layer and the client terminal 700 may be referred to as a lower-ordered layer.

The sophisticated decision making of the traffic safety service server 300 will be performed as follows.

The traffic safety service server 300 may receive IoT sensor data from the client terminal 700 and determine traffic safety for the transport containing the client terminal 700 equipped therein using the received IoT sensor data. Here, the IoT sensor data may be data on vibration, atmospheric pressure, a temperature, and the like for a transport such as a vessel, a drone, a vehicle, and a train acquired from IoT sensors by the client terminal 700 equipped in the transport and compressed data in a packet obtained by performing preprocessing on the acquired IoT sensor data. Furthermore, since received IoT sensor data, big data, data acquired offline, safety knowledge, a safety score, or the like may be used for determining traffic safety, the traffic safety service server 300 may perform sophisticated decision making in relation to traffic safety. The safety determination for the traffic safety service server 300 will be described in detail below with reference to FIG. 4. The traffic safety service server 300 may transmit an IoT control message including information on the determined traffic safety to the client terminal 700 to provide the the traffic safety information.

Quick decision making of the client terminal 700 will be performed as follows.

As described above, the client terminal 700 may acquire IoT sensor data of a transport from at least one IoT sensor. The client terminal 700 may compare the acquired IoT sensor data with a previously stored threshold value and sense a traffic incident or a traffic incident precursor through the comparison result. Here, the threshold value may be a value received from a traffic safety service server. Furthermore, when a traffic incident or a traffic incident precursor has been sensed, the client terminal 700 may provide a warning or an alarm to a driver, and when the client terminal 700 is connected to a controller of a vehicle, the client terminal 700 may stop the vehicle or reduce a speed of the vehicle for the purpose of traffic safety in real time. Thus, unlike the sophisticated decision making of the above-described traffic safety service, the client terminal 700 may determine the traffic safety of the vehicle on the basis of the IoT sensor data and the previously stored threshold value to perform quick decision making.

As described above, the traffic safety service provided by the traffic safety service providing device according to the embodiment of the present invention may be distributed from the traffic safety service server 300 and the client terminal 700 and performed. Thus, the decision and performance rights are dispersed so that a traffic incident or a traffic incident precursor can be sensed and quickly dealt with.

Figure 3:
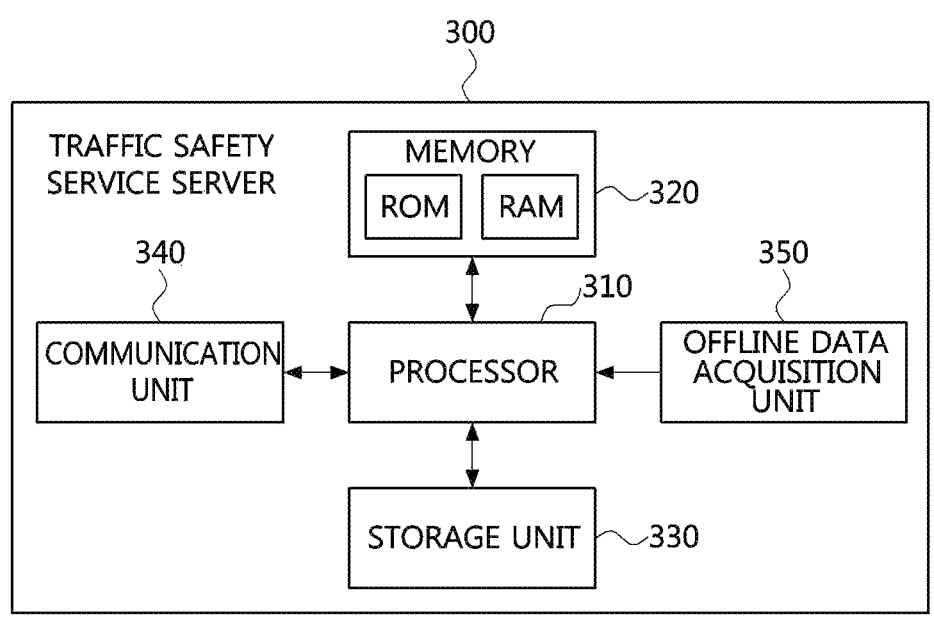
FIG. 3 is a block configuration diagram of a traffic safety service server according to the embodiment of the present invention.

FIG. 3 is a block configuration diagram of a traffic safety service server according to the embodiment of the present invention.

Referring to FIG. 3, the traffic safety service server according to the embodiment of the present invention may include at least one processor 310, a memory 320, and a storage unit 330 and may further include at least one of a communication unit 340 and an offline data acquisition unit 350.

The processor 310 may execute a program command stored in the memory 320 and/or the storage unit 330. The processor 310 may be a central processing unit (CPU), a graphics processing unit (GPU), or a dedicated processor in which the methods according to the present invention are performed. The memory 320 and the storage unit 330 may be constituted of a volatile storage medium and/or a non-volatile storage medium. For example, the memory 320 may be constituted of a read only memory (ROM) and/or a random access memory (RAM).

The memory 320 may store at least one command executed through the processor 310. The at least one command may include a command used for receiving sensor data of each sensor from a client terminal, a command used for calculating each safety score of at least one time slot in which sensor data is classified into data according to at least one specific time slot for each sensor, a command used for calculating an average of safety scores of at least one time slot to calculate a safety score for each sensor, and a command used for calculating a safety index on the basis of a safety score for each sensor and a weight assigned to each sensor.

Also, the at least one command may further include at least one of a command used for generating sensor data related to a virtual sensor on the basis of sensor data of each sensor, a command used for including sensor data related to a virtual sensor in the sensor data of each sensor, a command used for correcting a safety index on the basis of safety knowledge including a correlation between the safety index and at least one environmental parameter of a previously stored weather, season, and vehicle type; a command used for updating safety knowledge on the basis of sensor data of each sensor, a command used for setting a threshold value on the basis of sensor data of each sensor and a safety score of at least one time slot; a command used for determining whether a traffic incident has occurred on the basis of sensor data of each sensor and a threshold value; a command used for predicting at least one of a type of traffic incident, a damage range of a traffic incident, and an influence of a traffic incident by performing a traffic incident simulation on the basis of sensor data of each sensor and of a threshold value when it is determined that a traffic incident has occurred; and a command used for transmitting at least one of a threshold value and a safety index to a client terminal.

Details of a process performed by the processor 310 in accordance with at least one command stored in the memory 320 will be described below with reference to FIG. 4.

The communication unit 340 may include a communication module and may communicate with the client terminal 700 through the communication module. In other words, the communication unit 340 may transmit traffic safety information including a result of determining whether a traffic incident has occurred or a traffic incident precursor has occurred, a threshold value, a safety score, a safety index, an additional sensor data request, a warning message, and the like to the client terminal 700 using an IoT control message, and may receive sensor data of each sensor from the client terminal 700. Here, an external commercial network such as 3G, 4G, and Wi-Fi networks may be used for the communication between the communication unit 340 and the client terminal 700, but the present invention is not limited thereto.

The offline data acquisition unit 350 may acquire external data associated with traffic safety. In other words, the offline data acquisition unit 350 may directly receive data which is not present online like mode of transportation or past repair history of a transportation infrastructure from a user, and such data may be reflected in traffic safety determined by the traffic safety service server 300.

Figure 4:
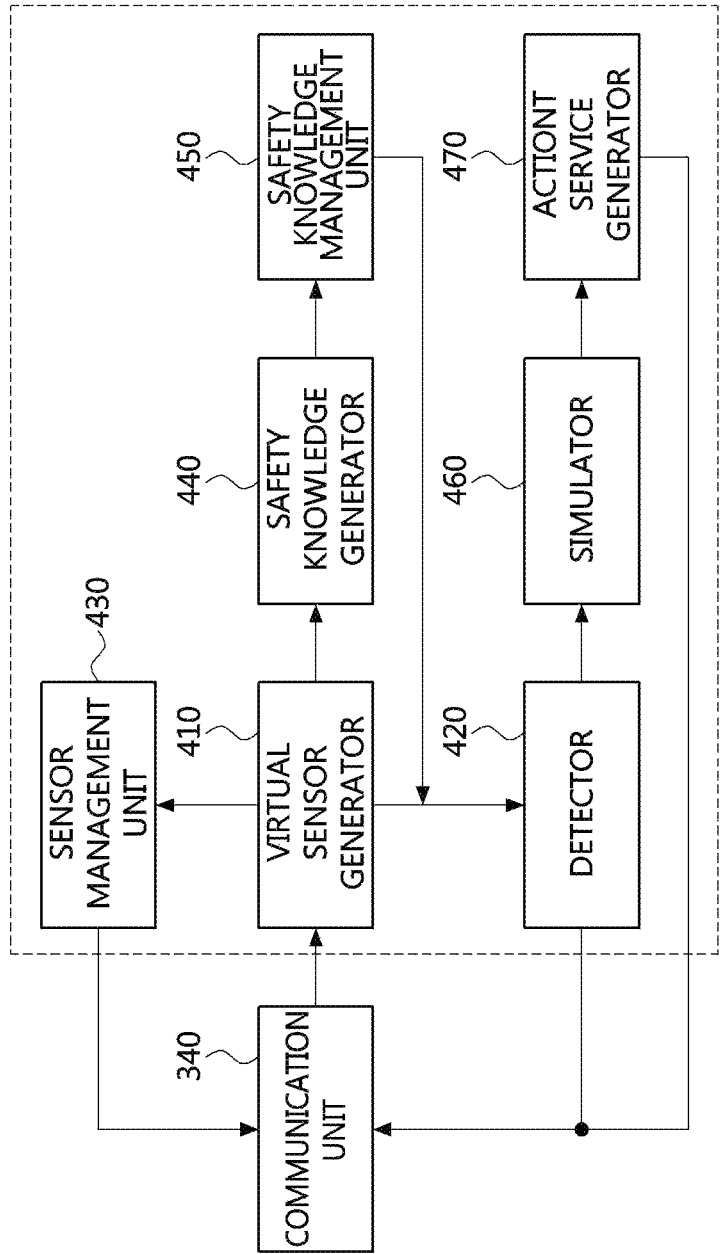
FIG. 4 is a block configuration diagram for describing an operation of the traffic safety service server according to the embodiment of the present invention.

FIG. 4 is a block configuration diagram for describing an operation of the traffic safety service server according to the embodiment of the present invention.

The commands performed by the processor 310 of the traffic safety service server according to the embodiment of the present invention may be represented by a plurality of constituent elements classified in accordance with the functions like in FIG. 4. The plurality of constituent elements may include a virtual sensor generator 410, a detector 420, a sensor management unit 430, a safety knowledge generator 440, a safety knowledge management unit 450, a simulator 460, and an action service generator 470. Here, the plurality of constituent elements are classified in accordance with function for convenience of explanation as described above and are not limited to their names.

The virtual sensor generator 410 may generate a virtual sensor and sensor data of a virtual sensor in accordance with a specific algorithm using sensor data of each sensor received by the communication unit 340. A method for generating a virtual sensor and sensor data of the virtual sensor in accordance with a specific algorithm will be described in detail with reference to FIG. 5. The virtual sensor generator 410 may provide the generated sensor data of the virtual sensor and the sensor data of each sensor received by the communication unit 340 to the detector 420 and/or the safety knowledge generator 440. In addition, when the specific sensor data required for generating the virtual sensor and the sensor data of the virtual sensor in accordance with the specific algorithm is insufficient, the virtual sensor generator 410 may provide information on the insufficient specific sensor data to the sensor management unit 430.

The detector 420 may determine whether a traffic incident has occurred or a traffic incident precursor has occurred on the basis of the sensor data of each sensor received by the communication unit 340 and the sensor data of the virtual sensor generated by the virtual sensor generator 410.

To be specific, the detector 420 may calculate a safety score for each sensor on the basis of the sensor data of each sensor and the sensor data of the virtual sensor and set a threshold value for each sensor on the basis of the safety score for each sensor. Here, the threshold value may include a danger threshold value and a warning threshold value. In other words, the detector 420 may determine whether a traffic incident has occurred on the basis of the sensor data of each sensor, the sensor data of the virtual sensor, and the danger threshold value and may determine whether a traffic incident precursor has occurred on the basis of the sensor data of each sensor, the sensor data of the virtual sensor, and the warning threshold value. A method for calculating a safety score for each sensor and a method for setting a threshold value for each sensor will be described in detail with reference to FIG. 6.

Also, the detector 420 may calculate a safety index of the client terminal 700 serving as a lower-ordered layer on the basis of the safety score for each sensor and may correct the safety index on the basis of the safety knowledge of the safety knowledge generator 440, which will be described below, to reflect an environmental factor. A method for calculating a safety index will be described in detail with reference to FIG. 9.

The detector 420 may transmit at least one of a result of determining whether a traffic incident or incident precursor has occurred, a threshold value, a safety score, and a safety index to the client terminal 700 serving as the lower-ordered layer through the communication unit 340. Furthermore, the detector 420 may provide at least one of the threshold value, the sensor data of each sensor, and the sensor data of the virtual sensor to the simulator 460 when it is determined that the traffic incident has occurred or the traffic incident precursor has been detected.

When the sensor management unit 430 acquires information on specific sensor data from the virtual sensor generator 410, the sensor management unit 430 may transmit a request for the specific sensor data to the client terminal 700 serving as the lower-ordered layer through the communication unit 340.

The safety knowledge generator 440 may generate safety knowledge on the basis of sensor data of a virtual sensor generated by the virtual sensor generator 410, sensor data of each sensor received by the communication unit 340, offline data, big data, or the like. Here, the safety knowledge may refer to a correlation between environmental parameters and a safety index of a transport or a transportation infrastructure. For example, a safety index of a road may be determined in accordance with state information such as the presence or absence of a port hole, flatness, and a gradient of the road and may be changed in accordance with weather, season, and vehicle type. In other words, even on the same road under the same conditions, small vehicles may be vulnerable but large vehicles may be safe, and the road may be dangerous in the winter but have safe in the spring. Thus, since such differences should be reflected in the safety index so that more accurate safety can be determined, the safety knowledge may refer to data defining such differences. In addition, the safety knowledge may be different with respect to the same object depending on a type of transport, an attribute of the transport, the driver's sex, the driver's age, or the like. Furthermore, the offline data may be data which is directly input by the user with a physical method and the big data may be data acquired using a method utilizing normal big data, but the present invention is not limited thereto. The safety knowledge generator 440 may provide the generated safety knowledge and the sensor data of each sensor acquired from the communication unit 340 to the safety knowledge management unit 450.

The safety knowledge management unit 450 may store, update, and manage the safety knowledge generated by the safety knowledge generator 440, select safety knowledge appropriate for the environmental factor of the client terminal 700 on the basis of the sensor data of each sensor acquired from the communication unit 340, and provide the selected safety knowledge to the detector 420.

The simulator 460 may simulate a traffic incident on the basis of the threshold value acquired from the detector 420, the sensor data of each sensor, and the sensor data of the virtual sensor to predict a type of incident, a damage range of the incident, an influence of the incident, and the like. A normal simulation method may be used as a method for simulating a traffic incident by the simulator 460, but the present invention is not limited thereto. Furthermore, the simulator 460 may provide the simulation result to the action service generator 470.

The action service generator 470 may establish a plan to deal with a traffic incident such as actions capable of minimizing damage from traffic incidents and actions capable of prevent traffic incidents on the basis of the simulation result of the simulator 460, and thus may transmit the simulation result and the established plan to the client terminal 700 serving as the lower-ordered layer through the communication unit 340 and may transmit the simulation result and the established plan to a manager of the traffic safety service server 300 or to an external location. Furthermore, the action service generator 470 may generate different alert messages in accordance with the type of incident, the damage range of an incident, the effect of an incident, and the like predicted by the simulator 460 and may transmit, through the communication unit 340, the generated different alert messages to the client terminal 700 serving as the lower-ordered layer.

Figure 5A:
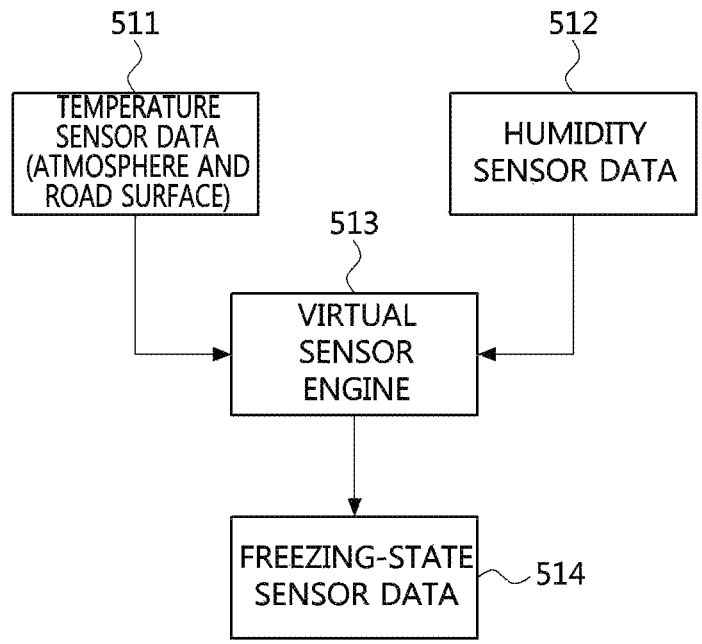
FIGS. 5A and 5B are conceptual diagrams of a virtual sensor operated in the traffic safety service server according to the embodiment of the present invention.
Figure 5B:
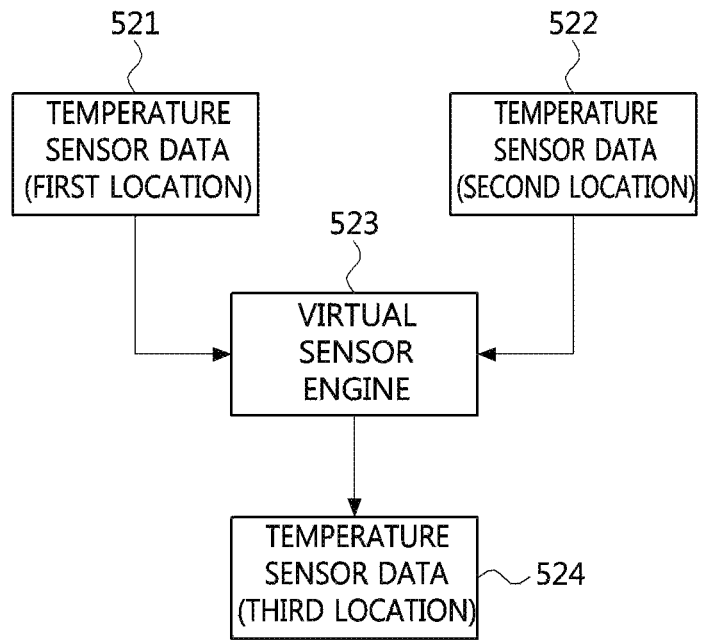

FIGS. 5A and 5B are conceptual diagrams of a virtual sensor operated in the traffic safety service server according to the embodiment of the present invention.

The virtual sensor generator 410 of the traffic safety service server 300 according to the embodiment of the present invention may generate, through a virtual sensor engine configured to perform a specific algorithm, a virtual sensor and sensor data of the virtual sensor on the basis of sensor data of each sensor acquired from the communication unit 340. A detailed description thereof will be provided with reference to FIGS. 5A and 5B using two examples.

Referring to FIG. 5A, the virtual sensor generator 410 may generate sensor data 514 of a freezing-state sensor using a virtual sensor engine 513 from sensor data 511 of a temperature sensor and sensor data 512 of a humidity sensor. Here, the virtual sensor engine 513 may perform an algorithm for a temperature, humidity, and a freezing-state. Furthermore, the algorithm for the temperature, the humidity, and the freezing-state may be set in advance by the manager of the traffic safety service server 300 and formed based on big data for the temperature, the humidity, and the freezing-state, but the present invention is not limited thereto.

Referring to FIG. 5B, the virtual sensor generator 410 may generate sensor data 524 of a temperature sensor at a virtual third location using a virtual sensor engine 523 from sensor data 521 of a temperature sensor at a first location and sensor data 522 of a temperature sensor at a second location. Here, the third location may be located between the first location and the second location, and the virtual sensor engine 523 may perform an algorithm configured to extract sensor data of the temperature sensor at the virtual third location in consideration of distances between the first location, the second location, and the third location and an environmental factor between the first location and the second location. For example, when the third location is in the middle of the first location and the second location and there is no special environmental factor between the first location and the second location, an intermediate value of the sensor data of the temperature sensor at the first location and the sensor data of the temperature sensor at the second location may be extracted as the sensor data of the temperature sensor at the virtual third location.

In other words, the virtual sensor generator 410 may generate sensor data of various virtual sensors using various algorithms.

Figure 6:
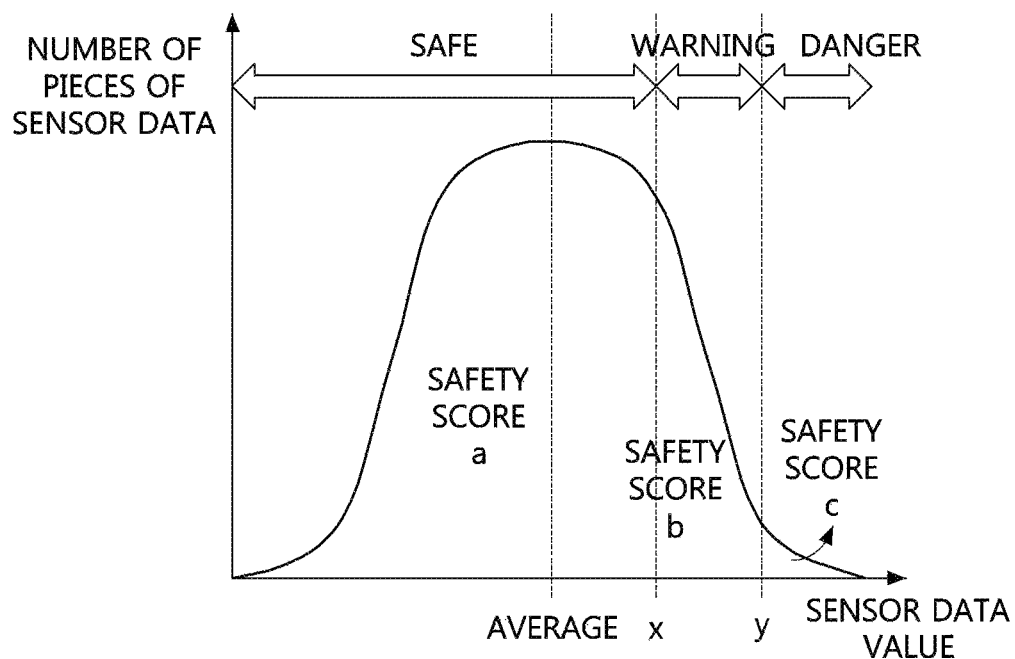
FIG. 6 is a diagram for describing a method for calculating a safety score in the traffic safety service server according to the embodiment of the present invention.

FIG. 6 is a diagram for describing a method for calculating a safety score in the traffic safety service server according to the embodiment of the present invention.

Referring to FIG. 6, the detector 420 of the traffic safety service server 300 according to the embodiment of the present invention may calculate three safety scores on the basis of the sensor data of each sensor acquired through the communication unit 340. Here, the number of safety scores which can be calculated is limited to three for the sake of convenience of explanation, but the detector 420 may calculate three or more safety scores in more detail.

The detector 420 may calculate a safety score for each sensor and calculate a safety score on the basis of the previous sensor data of the sensor. In other words, the detector 420 may accumulate the previous sensor data of the sensor, determine a location of the newly acquired sensor data based on the accumulated sensor data, and calculate a safety score on the basis of the location of the sensor data. Here, the accumulated sensor data may be in the form of a normal distribution and may be in a form in which sensor data is accumulated as it is, in accordance with a value, but the present invention is not limited thereto. Furthermore, an amount of accumulation of the previous sensor data may be of the past week, the past one year, or the like, but the present invention is not limited thereto. In addition, the amount of accumulation thereof may be set by the manager of the traffic safety service server 300.

Referring to FIG. 6, the detector 420 may accumulate the previous sensor data for a specific sensor in accordance with a sensor data value, and sections may have three classification sections in accordance with a magnitude of the sensor data value. Here, the three sections may refer to a first section in which the sensor data value is x or less, a second section in which the sensor data value is more than x and y or less, and a third section in which the sensor data value is more than y, and may represent a safe section, a section requiring attention, and a danger section. Moreover, x and y may be determined in accordance with a specific criterion determined through the manager of the traffic safety service server 300 or big data analysis.

The detector 420 may determine whether the sensor data of the sensor acquired from the communication unit 340 is included in any of the above-described three sections and thus may calculate a safety score. In other words, the detector 420 may calculate a safety score a when it is determined that the sensor data of the sensor is included in the first section and calculate a safety score b when it is determined that the sensor data of the sensor is included in the second section. Furthermore, when it is determined that the sensor data of the sensor is included in the third section, the detector 420 may calculate a safety score c.

For example, assuming that the sensor data acquired by the detector 420 is sensor data of the temperature sensor, x is a sensor data value indicating 0 degree Celsius, y is a sensor data value indicating −10 degree Celsius, a is 100, b is 80, and c is 50, a description will be provided as follows. When the detector 420 has a sensor data value in which the acquired sensor data indicates 5 degree Celsius, the detector 420 may calculate a safety score 100 because the sensor data value is included in the first section, and when the detector 420 has a sensor data value in which the acquired sensor data indicates −5 degree Celsius, the detector 420 may calculate a safety score 80 because the sensor data value is included in the second section. Furthermore, when the detector 420 has a sensor data value in which the acquired sensor data indicates −15 degree Celsius, the detector 420 may calculate a safety score 50 because the sensor data value is included in the third section.

Figure 7:
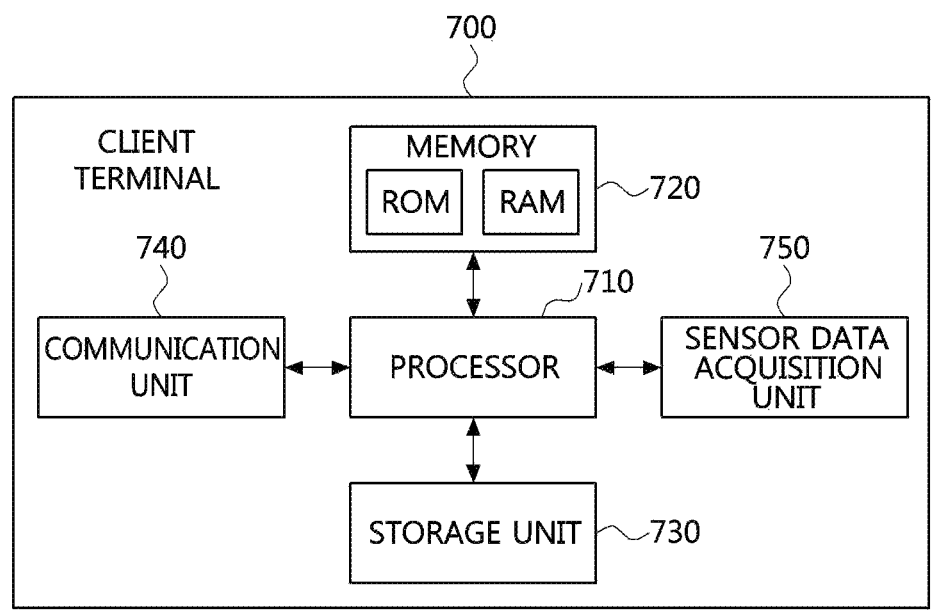
FIG. 7 is a block configuration diagram of a client terminal according to the embodiment of the present invention.

FIG. 7 is a block configuration diagram of a client terminal according to the embodiment of the present invention.

Referring to FIG. 7, the client terminal 700 according to the embodiment of the present invention may include at least one processor 710, a memory 720, and a storage unit 730 and may further include at least one of a communication unit 740 and a sensor data acquisition unit 750.

The processor 710 may execute a program command stored in the memory 720 and/or the storage unit 730. The processor 710 may be a CPU, a GPU or a dedicated processor in which methods according to the present invention are performed. The memory 720 and the storage unit 730 may be constituted of a volatile storage medium and/or a non-volatile storage medium. For example, the memory 720 may be constituted of a ROM and/or a RAM.

The memory 720 may store at least one command executed through the processor 710. The at least one command may include a command used for receiving a threshold value of sensor data from the traffic safety service server 300, a command used for receiving sensor data from at least one sensor, a command used for detecting traffic incident occurrence or incident precursor information on the basis of sensor data and a threshold value, and a command used for applying different processing to sensor data in accordance with the detection result, processing the sensor data, and transmitting the sensor data to the traffic safety service server 300.

Also, the at least one command may further include at least one of a command used for transmitting, to the traffic safety service server 300, sensor data as it is when traffic incident occurrence or incident precursor information is not detected and a command used for calculating a movement value average of sensor data and transmitting the movement value average to the traffic safety service server 300 when the traffic incident occurrence or incident precursor information is detected.

The processor 710 may receive at least one of a result of determining whether a traffic incident has occurred or a traffic incident precursor has occurred from the traffic safety service server 300 in accordance with a command stored in the memory 720 through the communication unit 740, a threshold value, a safety score, a safety index, and a warning message. Here, the threshold value may be a value set on the basis of sensor data previously transmitted by the client terminal 700 from the traffic safety service server 300. Furthermore, the threshold value may be a threshold value for each sensor data of each sensor and may be a threshold value according to a specific combination of a plurality of pieces of sensor data, but the present invention is not limited thereto. The processor 710 may provide at least one of a received result of determining whether a traffic incident has occurred or a traffic incident precursor has occurred, a safety score, a safety index, and a warning message to the driver or the like of the transport to inform the driver or the like of a current situation or a predicted situation.

The processor 710 may receive, through the sensor data acquisition unit 750, sensor data from at least one sensor in accordance with the command stored in the memory 720. The at least one sensor may be a sensor connected to the client terminal 700. Here, a client terminal may be connected to a sensor through wired or wireless communication, but the present invention is not limited thereto. In addition, the connection between the client terminal and the sensor may refer to a state in which data exchange is possible.

The processor 710 may detect traffic incident occurrence or incident precursor information on the basis of the sensor data and the threshold value in accordance with the command stored in the memory 720. The processor 710 may detect sensor data of a specific sensor, exceeding a threshold value of the specific sensor, as a traffic incident, and may detect a specific combination of a plurality of pieces of sensor data, exceeding the threshold value, as a traffic incident, but the present invention is not limited thereto. Furthermore, when the threshold value includes warning threshold values and the danger threshold value, a traffic incident may be detected when the sensor data exceeds the danger threshold value and a traffic incident precursor may be detected when the sensor data exceeds the other threshold values.

The processor 710 may detect a traffic incident or a traffic incident precursor at predetermined time intervals and use sensor data received at a predetermined time interval when detecting a traffic incident or a traffic incident precursor. Furthermore, the processor 710 may use a threshold value received for the same predetermined time interval. Here, the threshold value may be received once every predetermined time interval from the traffic safety service server 300. In other words, the processor 710 may detect traffic incident occurrence or incident precursor using at least one piece of sensor data and one threshold value received for a predetermined time interval and repeatedly detect traffic incident occurrence or incident precursor at predetermined time intervals.

The processor 710 may apply different processing to sensor data according to the detection result in accordance with the command stored in the memory 720, process the sensor data, and transmit the sensor data to the traffic safety service server. The processor 710 may transmit, to the traffic safety service server 300, the sensor data as raw data as it is through the communication unit 740 when the traffic incident occurrence or incident precursor is detected. Here, the processor 710 may pre-process and compress the sensor data when the traffic incident occurrence or incident precursor is not detected and transmit the sensor data to the traffic safety service server 300 through the communication unit 740 in the form of a packet.

For example, the processor 710 may calculate a representative value of the sensor data through a specific algorithm and transmit the representative value to the traffic safety service server 300. Furthermore, the processor 710 may calculate a movement value average of the sensor data and transmit the movement value average to the traffic safety service server 300. Here, the movement value average of the sensor data may be a movement value average of at least one piece of sensor data received at a predetermined time interval. Since the client terminal 700 according to the embodiment of the present invention compresses a certain amount of data like a representative value, a movement value average, or the like when a traffic incident or a traffic incident precursor does not occur and transmits the compressed data, the amount of transmitted data can be reduced and a wireless sensing network can be prevented from being saturated.

The processor 710 may provide, in accordance with the command stored in the memory 720 through the communication unit 740, a warning or an alarm to the driver of the transport in which the client terminal 700 is equipped when a traffic incident or incident precursor has occurred and may stop the transport or reduce a speed of the transport for the purpose of traffic safety in real time when the client terminal 700 is connected to a controller of the transport.

Figure 8:
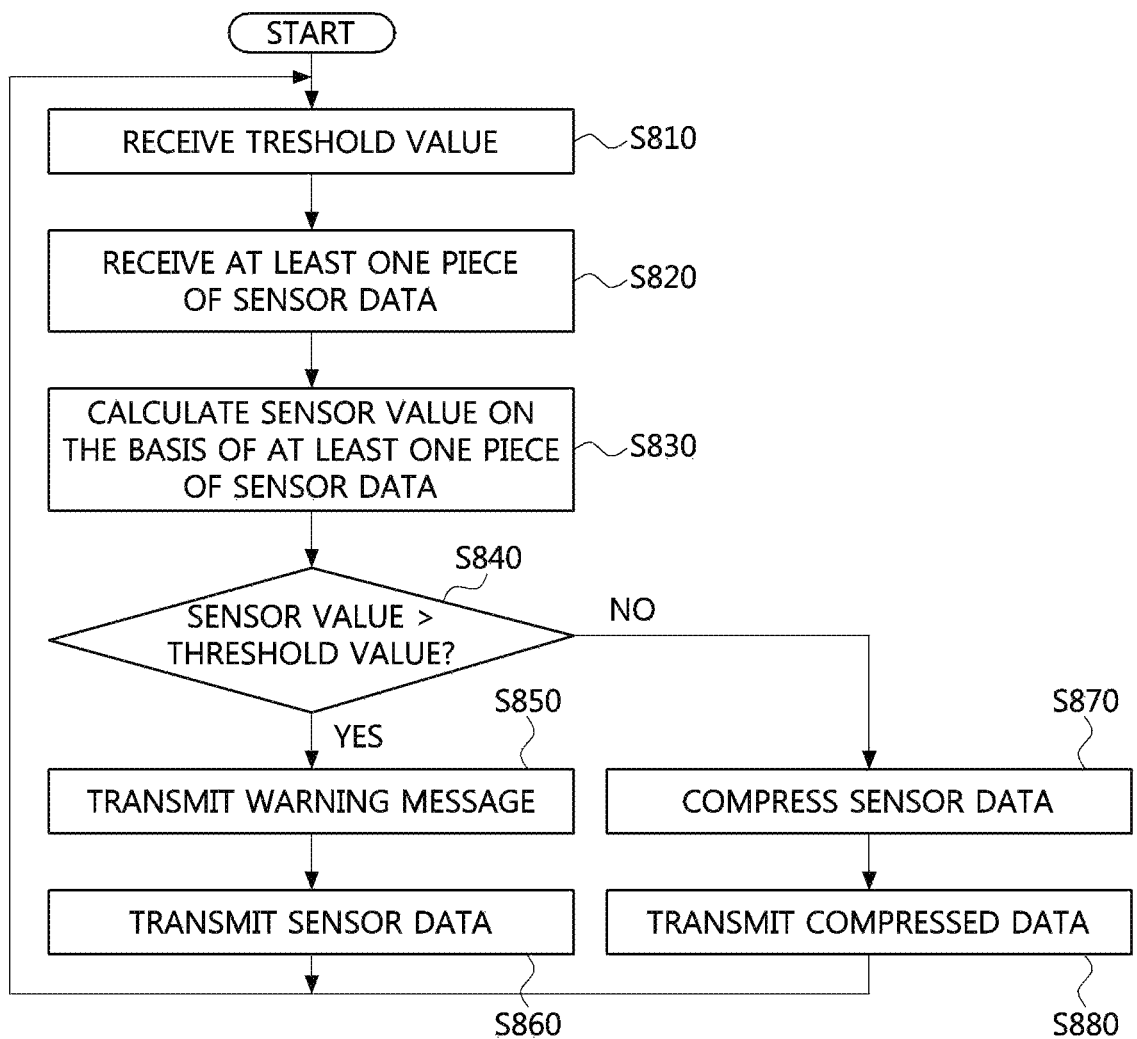
FIG. 8 is a flowchart for describing a method for sensing traffic incident occurrence or incident precursors in the client terminal according to the embodiment of the present invention.

FIG. 8 is a flowchart for describing a method for sensing a traffic incident occurrence or incident precursor in the client terminal according to the embodiment of the present invention.

For convenience of explanation, it is assumed that the client terminal 700 is connected to one sensor. Here, the present invention is not limited thereto. In addition, the client terminal 700 may be connected to a plurality of sensors. In this case, it is possible to determine whether a traffic incident or incident precursor has occurred for each sensor and it is possible to determine, in consideration of a relationship between a plurality of sensors, whether a traffic incident or incident precursor has occurred.

The client terminal 700 according to the embodiment of the present invention may determine, at predetermined time intervals, whether a traffic incident or incident precursor has occurred. Referring to FIG. 8, a method for the client terminal 700 determining, at one time interval, whether a traffic incident or incident precursor has occurred is as follows.

Referring to FIG. 8, the client terminal 700 may receive a threshold value from the traffic safety service server 300 (S810) and receive at least one piece of sensor data from at least one sensor connected to the client terminal 700 (S820). Subsequently, the client terminal 700 may calculate one sensor value in accordance with a specific algorithm on the basis of the at least one piece of sensor data (S830). Here, Step S830 may be omitted when all of the at least one piece of sensor data are compared with a threshold value.

The client terminal 700 may compare magnitudes of the sensor value and the threshold value (S840). In addition, when it is determined that the sensor value exceeds the threshold value, it is determined that traffic incident occurrence or incident precursor has been detected. Thus, the client terminal 700 may transmit a warning message or an alarm to the driver of the transport (S850). Furthermore, the client terminal 700 may transmit the at least one piece of sensor data as it is to the traffic safety service server 300 (S860).

Here, when the sensor value does not exceed the threshold value, it is determined that the traffic incident or incident precursor is not detected. Thus, the client terminal may compress the at least one piece of sensor data (S870). Here, the compression may refer to calculating a representative value in accordance with a specific algorithm or calculating a movement value average for at least one piece of sensor data value, but the present invention is not limited thereto. Furthermore, the client terminal 700 may transmit the compressed data to the traffic safety service server 300 (S880). Here, when one sensor value is calculated in Step S830, Step S870 will be omitted. In addition, when Step S870 will be omitted, the client terminal 700 will transmit the one sensor value to the traffic safety service server 300.

Subsequently, the client terminal 700 may receive the threshold value again from the traffic safety service server 300 (S810) and repeatedly perform the above-described steps at predetermined time intervals.

Figure 9:
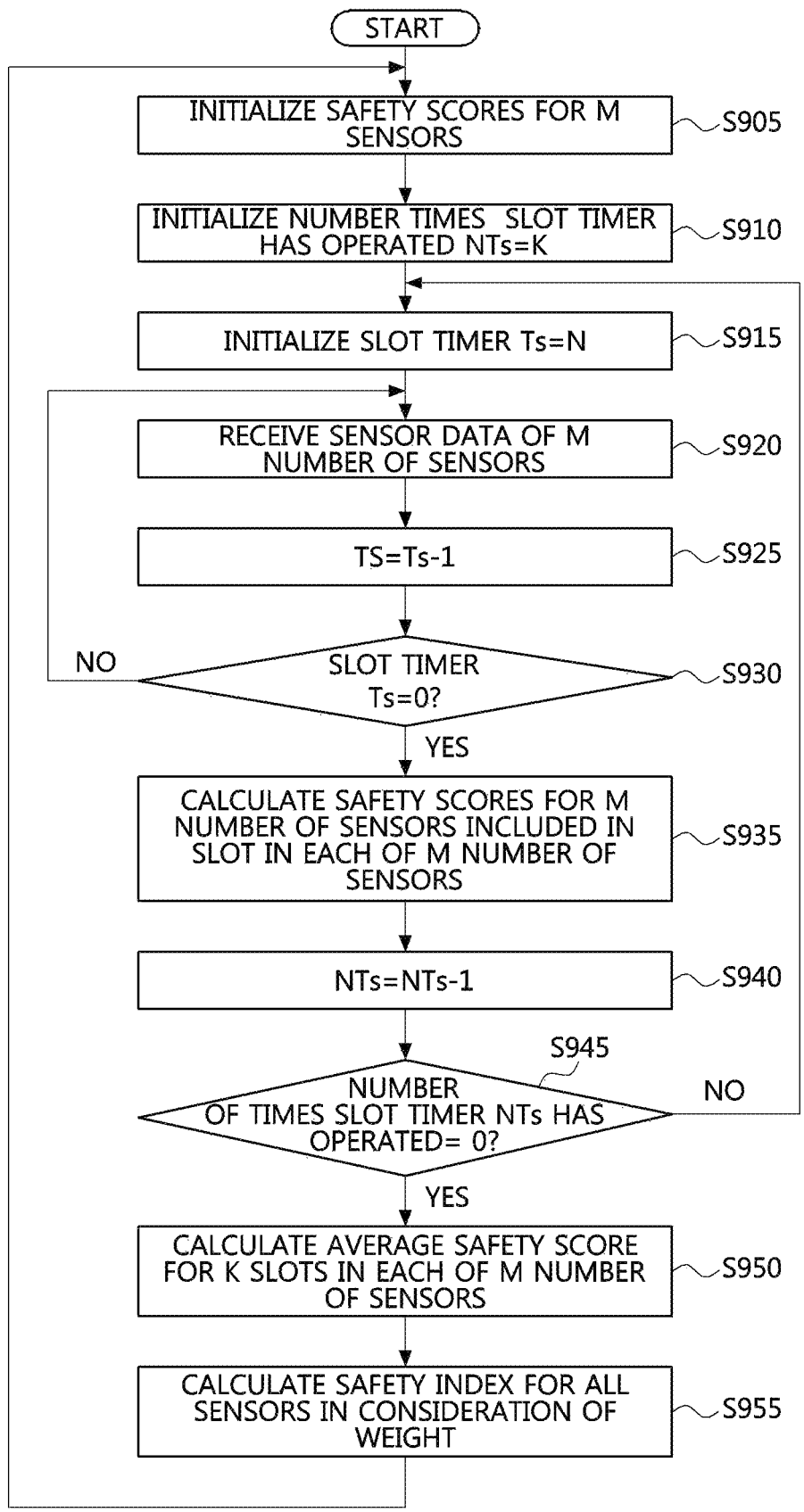
FIG. 9 is a flowchart for describing a method for calculating a safety index in the traffic safety service server according to the embodiment of the present invention.

FIG. 9 is a flowchart for describing a method for calculating a safety index in the traffic safety service server according to the embodiment of the present invention.

For convenience of explanation, it is assumed that the client terminal 700 connected to the traffic safety service server 300 is connected to M (which is a certain positive integer) number of sensors. Furthermore, the traffic safety service server 300 may calculate a safety index at a predetermined time interval and the predetermined time interval may be determined in accordance with the number of slot timers.

Here, the slot timer may be a timer used for setting a predetermined time interval, and sensor data received while the slot timer operates one time may be assigned to one slot. Furthermore, the slot timer may repeatedly operate according to the number of times the slot timer has operated. For example, when the number of the slot timer is two and the slot timer has an initial value of 10 seconds, the traffic safety service server 300 may receive sensor data from 1 second to 10 seconds using the slot timer and assign the sensor data to a first slot. In addition, using the slot timer, the traffic safety service server 300 may receive sensor data again from 11 seconds to 20 seconds after the slot timer is initialized and may assign the sensor data to a second slot. Here, a unit of the slot timer may be changed in accordance with the setting and is not limited to the above-described unit of seconds.

Referring to FIG. 9, in a method for calculating a safety index in the traffic safety service server 300 according to the embodiment of the present invention, first, safety scores for M sensors may be initialized (S905) and the number of times the slot timer has operated NTs may be initialized to K (S910). Furthermore, the slot timer Ts may also be initialized to N (S915).

After completing the initialization, the traffic safety service server 300 may receive sensor data of M number of sensors from the client terminal 700 (S920) and reduce a value of the slot timer Ts by one (S925). The client terminal 700 may determine whether the value of the slot timer Ts is 0 (S930). When it is determined that the value thereof is not 0, the traffic safety service server 300 may receive sensor data of M number of sensors again (S920). Here, Steps S920 and S925 are repeatedly performed until the value of the slot timer Ts is 0. When it is determined that the value of the slot timer Ts is 0, the traffic safety service server 300 may acquire the same number of pieces of sensor data as an initial value N of the slot timer for each sensor. In other words, one slot may refer to an interval in which the slot timer Ts operates from N to 0 and N pieces of sensor data for each sensor may be assigned to one slot.

Subsequently, the traffic safety service server 300 may calculate a safety score for one slot for each sensor (S935) and reduce a value of the number of times the slot timer NTs has operated by one (S940). Furthermore, the traffic safety service server 300 may determine whether the value of the number of times the slot timer NTs has operated is 0 (S945). When it is determined that the value thereof is not 0, the traffic safety service server 300 may initialize the value Ts to N again (S915). Here, Steps S915 to S940 are repeatedly performed until the value of the number of the slot timer has operated NTs is 0. When it is determined that the value of the number of times the slot timer has operated NTs is 0, the traffic safety service server 300 may acquire the same number of slots as a value of the number of times the slot timer K has been used, and N pieces of sensor data may be assigned to each slot. In other words, the traffic safety service server 300 may acquire K number of slots for each sensor and acquire a safety score of each of K number of slots for each sensor.

Also, the traffic safety service server 300 may calculate an average value for the safety score of K number of slots for each sensor and calculate an average safety score for each sensor (S950). In other words, the traffic safety service server 300 may acquire average safety scores of M number of sensors. Subsequently, the traffic safety service server 300 may calculate a safety index for the client terminal 700 on the basis of the average safety scores of M number of sensors in consideration of a weight for each sensor in accordance with Math. 1 (S955).

$$SI = \sum_{j=1}^{M} W_j \cdot \frac{\sum_{i=1}^{K}(SS_{max} - D_i) \cdot T_i}{D_T}$$

[Math. 1]

In Math. 1, a safety index (SI) may represent a safety index and $W_j$ may represent a weight. Furthermore, M may represent the number of sensors and K may represent the number of the slot timer. $T_i$ may represent a time of a slot and $D_T$ may represent a total amount of action time used in calculating the safety index. Furthermore, since $SS_{max}$ may represent a maximum value of a safety score and $D_i$ may represent a safety score which is reduced from the maximum value of the safety score, $SS_{max}-D_i$ may represent a safety score of the slot.

Here, the weight may refer to a weight of data sensed by each sensor in the traffic incident occurrence and may be stochastically determined based on past traffic incident statistics information. For example, in the case of a vehicle, weights of a temperature value, a vibration value, and a tire pressure value of a vehicle drive bearing may be determined as 0.3, 0.5, and 0.2, respectively.

Figure 10:
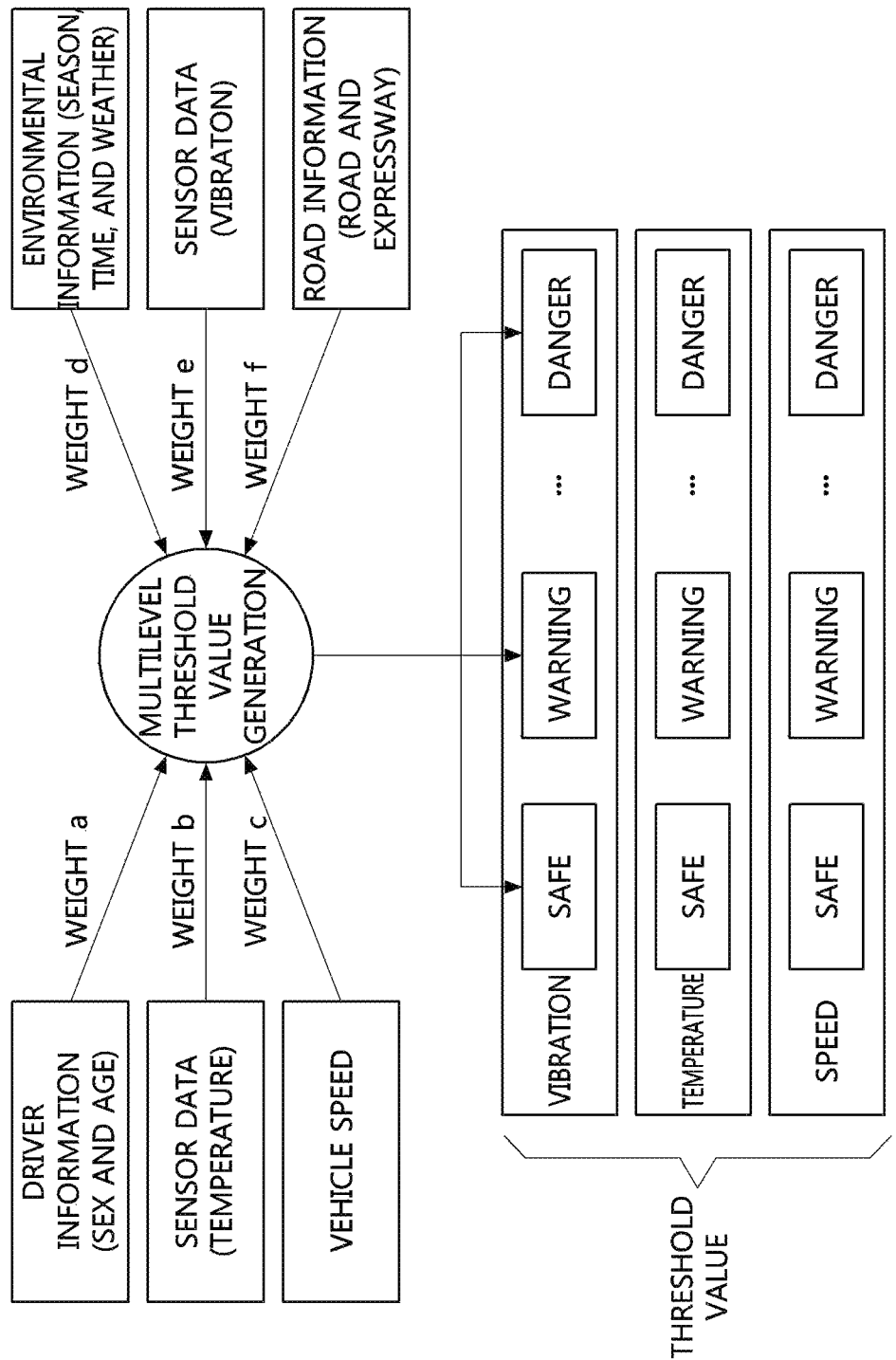
FIG. 10 is a diagram for describing a method for generating a threshold value in the traffic safety service server according to the embodiment of the present invention.

FIG. 10 is a diagram for describing a method for generating a threshold value in the traffic safety service server according to the embodiment of the present invention.

Referring to FIG. 10, the traffic safety service server 300 according to the embodiment of the present invention may generate the threshold value on the basis of safety knowledge and the received sensor data for each sensor. Here, the threshold value may include a multilevel threshold value and the multilevel threshold value may be a threshold value for each level or each danger level. Furthermore, the traffic safety service server 300 may generate a threshold value by applying a weight assigned to each piece of information.

To be more specific, like in FIG. 10, it is assumed that a threshold value is generated on the basis of driver information, temperature information, vehicle speed information, environment information, vibration information, and road information. Here, sensor data may be the temperature information, the vehicle speed information, and the vibration information, and safety knowledge may be the driver information, the environment information, and the road information, but the present invention is not limited thereto. Furthermore, information for generating the threshold value is not limited to the information listed above.

The traffic safety service server 300 may provide a weight a to driver information including the driver's sex, age, or the like and provide a weight b to temperature sensor data. Furthermore, the traffic safety service server 300 may provide a weight c, a weight d, a weight e, and a weight f to a vehicle speed, environmental information such as a season, a time, and a climate, vibration sensor data, and road information of a general road, an expressway, or the like, respectively.

Subsequently, the traffic safety service server 300 may generate a threshold value for vibration, temperature, and/or a speed on the basis of each piece of information to which each of the weights is assigned. Here, the threshold value may include a threshold value beyond or below which a current state can be determined as a safe state, a threshold value beyond or below which the current state can be determined as requiring attention, and a threshold value beyond or below which the current state can be determined as a danger state.

FIG. 11 is a diagram for describing a method for sensing a traffic incident trouble occurrence or incident precursor in the client terminal according to the embodiment of the present invention.

Referring to FIG. 11, the client terminal 700 according to the embodiment of the present invention may detect traffic an incident occurrence or incident precursor by time using the threshold value received from the traffic safety service server 300.

To be more specific, like in FIG. 11, it is assumed that the client terminal 700 receives a threshold value for each of a level of vibration, a temperature, and a speed from the traffic safety service server 300. Furthermore, it is assumed that the client terminal 700 may be connected to a vibration sensor, a temperature sensor, and a vehicle speed sensor to acquire sensor data for vibration, sensor data for a temperature, and sensor data for a vehicle speed in real time or at predetermined time intervals.

The client terminal 700 may compare the acquired sensor data for the vibration with the received threshold value for the vibration and compare the acquired sensor data for the temperature with the received threshold value for the temperature. Furthermore, the client terminal 700 may compare the acquired sensor data for the vehicle speed with the received threshold value for the vehicle speed.

After performing the comparison with each of the threshold values, the client terminal 700 may determine each item to be at safe, warning, or danger levels. Here, the client terminal 700 may perform the comparison determination in real time and perform the comparison determination at predetermined time intervals.

Also, the client terminal 700 may determine a current state of the transport to be in a danger state when it is determined that any one of the items is at a danger level and determine a current state of the transport to be in a danger state when it is determined that any two of the items is in a warning state, but a method for determining the overall state of the transport on the basis of the level for each item is not limited thereto.

The client terminal 700 can determine the overall state of the transport in accordance with the above-described process, determine the overall state of the transport in real time when the comparison determination is performed in real time, and determine the overall state of the transport at predetermined time intervals when the comparison determination is performed at predetermined time intervals. Furthermore, the client terminal 700 can provide a current state to the user in real time when the comparison determination is performed in real time and provide a current state to the user at predetermined time intervals when the comparison determination is performed at predetermined time intervals, and can store the previous states. Such previous states may be provided in accordance with the user's request or a request of the traffic safety service server 300.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software. Examples of the computer readable medium may include magnetic media such as hardware disk, floppy disk, and magnetic tape, optical media such as CD-ROM and DVD, ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the example embodiments of the present invention and their advantages have been described in detail, it should be understood that various changes, substitutions and alterations may be made herein without departing from the scope of the invention.

What is claimed is:

1. A method for providing a traffic safety service of a traffic safety service server communicating with a client terminal, the method comprising:
   receiving sensor data of at least one sensor connected to the client terminal;
   classifying sensor data into data according to at least one specific time slot for the at least one sensor and calculating a safety score of each of the at least one time slot;
   calculating an average of the safety scores of the at least one time slot and calculating a safety score for the at least one sensor;
   calculating a safety index on the basis of the safety score for the at least one sensor and a weight assigned to the at least one sensor;
   generating sensor data for a virtual sensor on the basis of the sensor data of the at least one sensor, wherein the virtual sensor is generated in accordance with a specific algorithm using the sensor data of the at least one sensor;
   including the sensor data for the virtual sensor in the sensor data of the at least one sensor; and
   providing the client terminal with the safety index to be used to determine whether a traffic incident or a traffic incident precursor has occurred or not.

2. The method of claim 1, further comprising:
   correcting the safety index on the basis of safety knowledge including a correlation between the safety index and at least one environmental parameter of a previously stored weather, season, and vehicle type.

3. The method of claim 2, further comprising:
   updating the safety knowledge on the basis of the sensor data of the at least one sensor.

4. The method of claim 1, further comprising:
   setting a threshold value on the basis of the sensor data of the at least one sensor and the safety score of the at least one time slot.

5. The method of claim 4, further comprising:
   determining whether a traffic incident has occurred on the basis of the sensor data of the at least one sensor and the threshold value.

6. The method of claim 5, further comprising:
   predicting at least one of a traffic incident type, a damage range of the traffic incident, and effects of the traffic incident by performing a traffic incident simulation on the basis of the sensor data of the at least one sensor and the threshold value when it is determined that the traffic incident has occurred.

7. The method of claim 4, further comprising:
   providing the client terminal with the threshold value.

8. The method of claim 1, wherein a weight for the at least one sensor is stochastically determined on the basis of traffic incident statistics information.

9. A method for providing a traffic safety service of a client terminal communicating with a traffic safety service server and at least one sensor, the method comprising:
   receiving a threshold value of sensor data from the traffic safety service server;
   receiving sensor data from the at least one sensor;
   detecting traffic incident occurrence or incident precursor information on the basis of the sensor data and the threshold value;
   applying different processing to the sensor data in accordance with the detection result, processing the sensor data, and transmitting the sensor data to the traffic safety service server; and providing a user with a result of the detecting traffic incident occurrence or incident precursor information, wherein the sensor data for a virtual sensor is generated on the basis of the sensor data of the sensor and included in the sensor data of the sensor, the virtual sensor being generated in accordance with a specific algorithm using the sensor data of the sensor.

10. The method of claim 9, wherein the applying of the different processing to the sensor data in accordance with the detection result, the processing of the sensor data, and the transmitting of the sensor data to the traffic safety service server includes:

transmitting the sensor data as it is to the traffic safety service server when the traffic incident occurrence or incident precursor information is not detected.

11. The method of claim 9, wherein the applying of the different processing to the sensor data in accordance with the detection result, the processing of the sensor data, and the transmitting of the sensor data to the traffic safety service server includes:

calculating a movement value average of the sensor data and transmitting the movement value average to the traffic safety service server when the traffic incident occurrence or incident precursor information is detected.

12. A traffic safety service server comprising:

a processor; and a memory configured to store at least one command executed through the processor, wherein the at least one command is executed to:

receive sensor data of at least one sensor connected to a client terminal;

classify the sensor data into data according to at least one specific time slot for the at least one sensor and calculate a safety score of each of the at least one time slot;

calculate an average of the safety scores of the at least one time slot and calculate a safety score for the at least one sensor;

calculate a safety index on the basis of a safety score of the at least one sensor and a weight assigned to the at least one sensor;

generate sensor data for a virtual sensor on the basis of the sensor data of the at least one sensor, wherein the virtual sensor is generated in accordance with a specific algorithm using the sensor data of the at least one sensor;

include the sensor data for the virtual sensor in the sensor data of the at least one sensor; and provide the client terminal with the safety index to be used to determine whether a traffic incident or a traffic incident precursor has occurred or not.

13. The traffic safety service server of claim 12, wherein the at least one command is executed to correct the safety index on the basis of safety knowledge including a correlation between the safety index and at least one environmental parameter of a previously stored weather, season, and vehicle type.

14. The traffic safety service server of claim 13, wherein the at least one command is executed to update the safety knowledge on the basis of the sensor data of the at least one sensor.

15. The traffic safety service server of claim 12, wherein the at least one command is executed to set a threshold value on the basis of the sensor data of the at least one sensor and the safety score of the at least one time slot.

16. The traffic safety service server of claim 15, wherein the at least one command is executed to determine whether a traffic incident has occurred on the basis of the sensor data of the at least one sensor and the threshold value.

17. The traffic safety service server of claim 16, wherein the at least one command is executed to predict at least one of a traffic incident type, a damage range of the traffic incident t, and effects of the traffic trouble by performing a traffic incident simulation on the basis of the sensor data of the at least one sensor and the threshold value when it is determined that the traffic incident has occurred.

18. The traffic safety service server of claim 15, wherein the at least one command is executed to provide the client terminal with the threshold value.

* * * * *